United States Patent
Stevens

(10) Patent No.: US 7,370,885 B2
(45) Date of Patent: May 13, 2008

(54) MICRO GAS GENERATOR

(75) Inventor: Bruce A. Stevens, Oakland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/266,992

(22) Filed: Nov. 4, 2005

(65) Prior Publication Data

US 2006/0097506 A1    May 11, 2006

Related U.S. Application Data

(60) Provisional application No. 60/625,351, filed on Nov. 5, 2004.

(51) Int. Cl.
*B60R 21/26* (2006.01)
(52) U.S. Cl. .............. 280/741; 280/806; 102/530
(58) Field of Classification Search ............... 280/806, 280/741, 736, 742; 102/530, 531; 60/632
See application file for complete search history.

(56) References Cited

U.S. PATENT DOCUMENTS

| | | | | |
|---|---|---|---|---|
| 5,380,039 A | * | 1/1995 | Emery et al. ............... | 280/741 |
| 5,531,475 A | * | 7/1996 | Meduvsky et al. .......... | 280/741 |
| 5,636,865 A | * | 6/1997 | Riley et al. ................. | 280/741 |
| 5,648,634 A | | 7/1997 | Avory et al. ............. | 102/202.1 |
| 6,168,202 B1 | | 1/2001 | Stevens ....................... | 280/737 |
| 6,749,216 B2 | * | 6/2004 | Tanase et al. ............. | 280/730.2 |
| 6,786,507 B2 | * | 9/2004 | Dolling et al. ............... | 280/737 |
| 6,789,485 B2 | * | 9/2004 | Moquin et al. .............. | 102/530 |
| 6,908,104 B2 | * | 6/2005 | Canterberry et al. ........ | 280/736 |
| 2004/0212183 A1 | * | 10/2004 | Henning et al. ............ | 280/737 |

* cited by examiner

*Primary Examiner*—Paul N. Dickson
*Assistant Examiner*—Drew J. Brown
(74) *Attorney, Agent, or Firm*—L. C. Begin & Associates, PLLC.

(57) ABSTRACT

A gas generator (10) is provided, comprising an initiator (48) including an initiator charge, a gas generant insert (52) spaced apart from the initiator (48), and a fluid-impermeable blast director (42) interposed between the initiator (48) and the gas generant insert (52). The blast director (42) provides a barrier between the gas generant insert (52) and a blast resulting from ignition of the initiator charge when the initiator charge is ignited. The blast director (42), when used with particular gas generant configurations, reduces the effects of the initiator blast and reduces the amount of gas generant exposed to the blast, enabling the structural integrity of the gas generant (52) to be maintained.

8 Claims, 4 Drawing Sheets

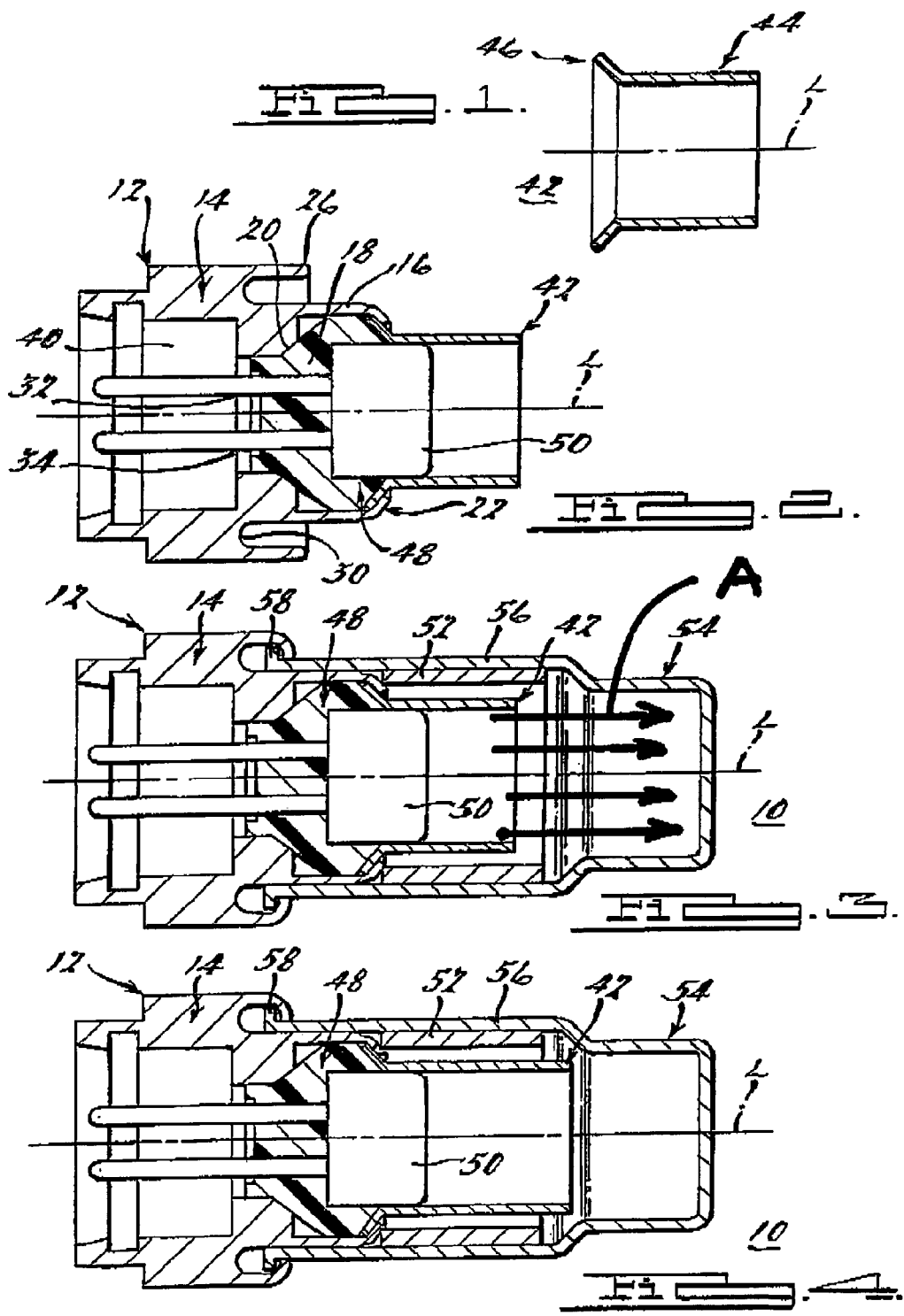

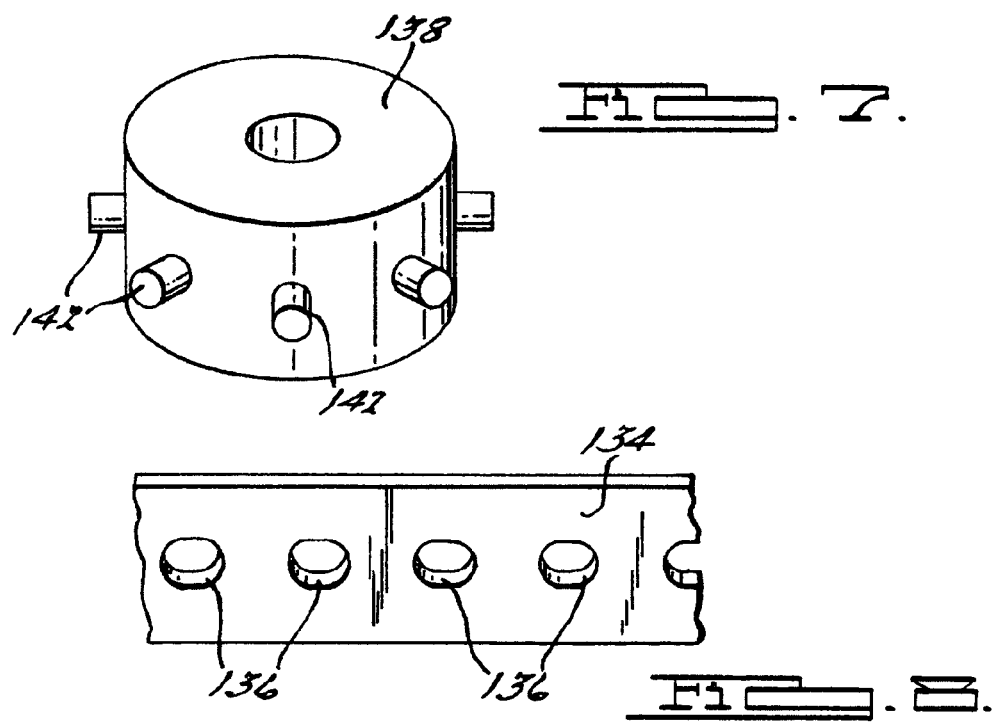
FIG. 7.
FIG. 8.
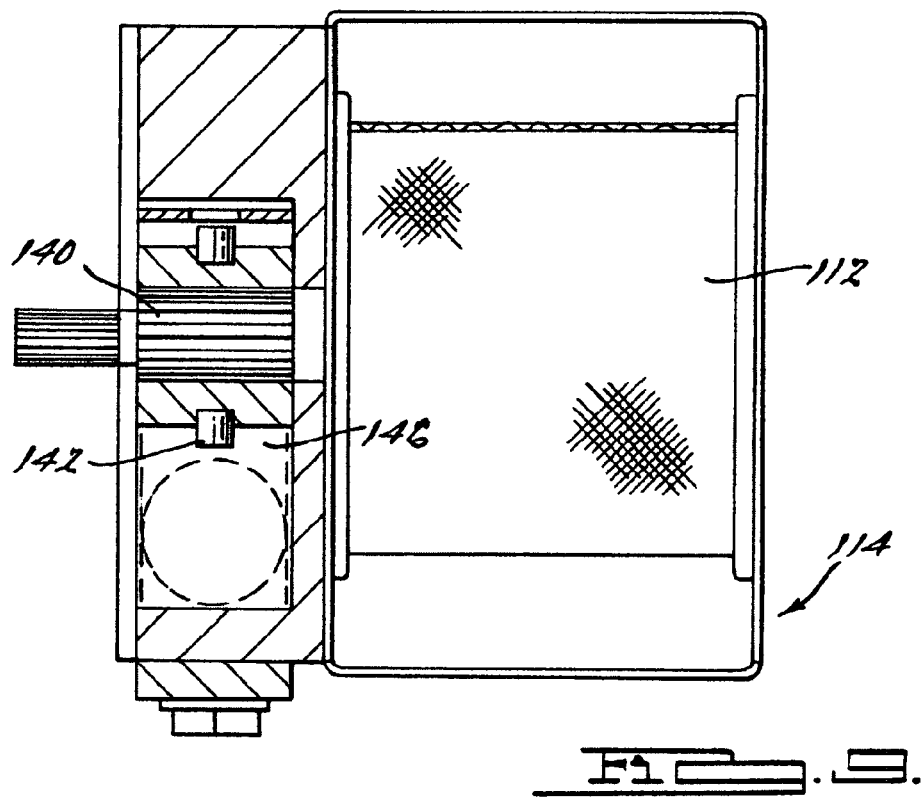
FIG. 9.

MICRO GAS GENERATOR

CROSS REFERENCE TO RELATED APPLICATIONS

This application claims the benefit of provisional application Ser. No. 60/625,351, filed on Nov. 5, 2004.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally contain an initiator including an initiator charge, an initiator retainer, and a gas generant composition which ignites and burns in response to ignition of the initiator to produce gases for actuating the seatbelt pretensioner.

In some micro gas generators, the gas generant is provided in tablet form wherein the aggregate combustion surface area is substantially higher than in gas generants provided in monolithic gas generating casts or inserts, for example. The total surface area of the gas generant in any gas generator is often optimized based on the burning rate of the respective gas generant composition. Historically, many azide-based compositions have been satisfactorily provided in tablet form given the relatively low burn rate of many azide-based compositions. With the advent of non-azide compositions, however, relatively higher burn rates often require a relatively lower aggregate gas generant surface area. Monolithic casts or inserts can be formed that effectively reduce the total gas generant surface area exposed to combustion.

In cases where the gas generant insert is in direct communication with the initiator during initiator activation, flame and ignition products from the initiator may fracture the gas generant insert. The resulting gas generant fragments will generally have a greater aggregate surface area than the intact gas generant cast. In addition, the sizes of the resulting gas generant cast fragments are unpredictable. These factors contribute to ballistic variability, making it difficult to control and predict the inflation characteristics of the gas generator.

Devices such as seatbelt pretensioners require a low initial pressurization and slow starting gas generation. The magnitude of the initial pressurization produced by activation of the initiator is directly related to initiator charge mass and surface area of the gas generant exposed to the initiator blast. Thus, one means of reducing the likelihood of gas generant insert fracture is to reduce the initiator charge mass. However, it can be expensive and/or inconvenient to reduce the initiator charge mass in order to reduce the likelihood of gas generant cast fracture. Thus, it is preferable to attempt to control the magnitude of the initial pressurization by controlling the gas generant surface area exposed to the blast. To do so, the geometry of the gas generant insert must be maintained during activation of the initiator.

SUMMARY OF THE INVENTION

A gas generator is provided, comprising an initiator including an initiator charge, a gas generant composition spaced apart from the initiator, and a fluid-impermeable blast director interposed between the initiator and the gas generant composition. The blast director provides a barrier between the gas generant composition and a blast resulting from ignition of the initiator charge when the initiator charge is ignited. The blast director, when used with particular gas generant configurations, reduces the effects of the initiator blast and reduces the amount of gas generant exposed to the blast, enabling the structural integrity of a pre-formed gas generant insert to be maintained. The blast director disclosed herein is a simple, low cost solution to the problem of preventing blast damage to a shaped gas generant insert. A particular (but not restrictive) application of the gas generator disclosed herein is in a micro gas generator (MGG), wherein the gas generant is a single cylindrical piece housed in a casing.

BRIEF DESCRIPTION OF THE DRAWINGS

FIG. 1 is a cross-sectional side view of an initiator blast director in accordance with the present invention;

FIG. 2 is a cross-sectional side view of an initiator sub-assembly incorporating the blast director shown in FIG. 1;

FIG. 3 is a cross-sectional side view of a first embodiment of a gas generator in accordance with the present invention;

FIG. 4 is a cross-sectional side view of a second embodiment of a gas generator in accordance with the present invention;

FIG. 7 is a perspective view of a pretensioner hub having a plurality of circumferential protrusions integral thereto;

FIG. 8 is an elevational view of a perforated strap having a plurality of perforations;

FIG. 9 is an elevational view of the pretensioner of FIG. 5 in cooperation with a state-of-the-art seat belt retractor.

DETAILED DESCRIPTION

Figure 5:
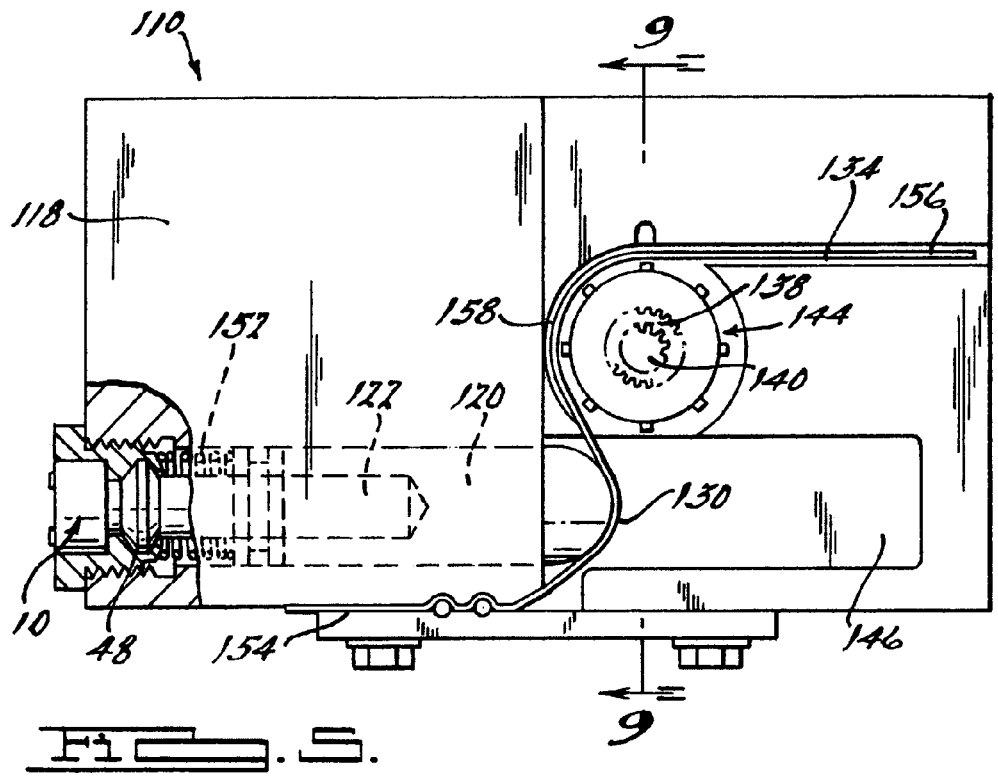
FIG. 5 is a diagrammatic elevational view of a seat belt pretensioner incorporating an embodiment of the gas generator of the present invention.
Figure 6:
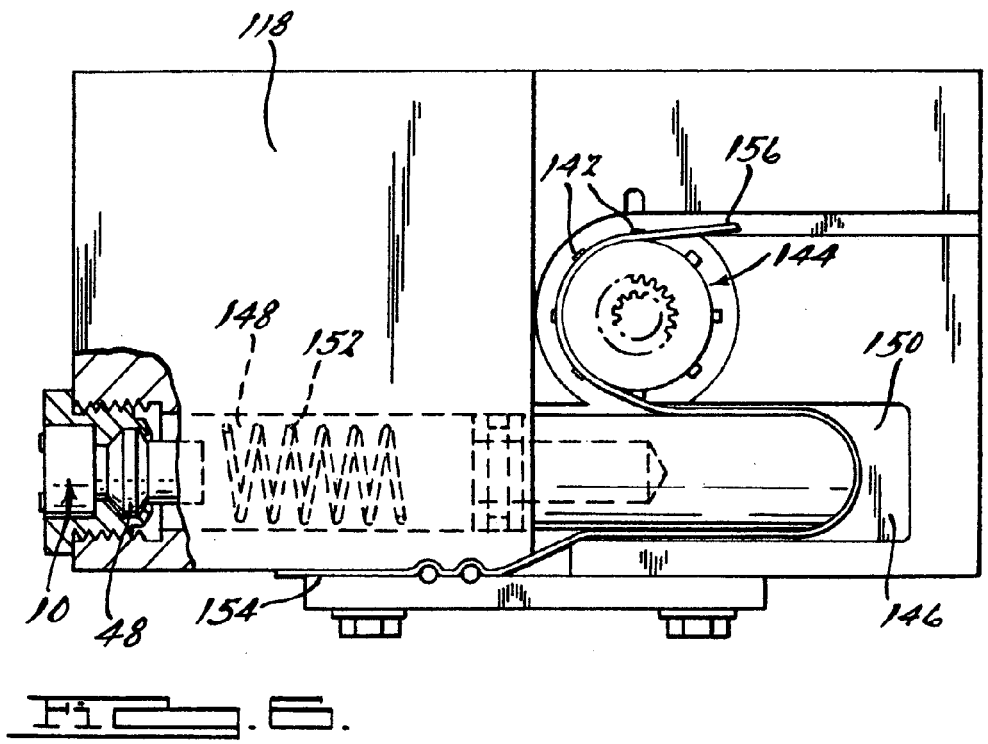
FIG. 6 is a diagrammatic elevational view of the pretensioner of FIG. 5 illustrating activation of the pretensioner.

FIGS. 1-3 show a gas generator incorporating an initiator blast director in accordance with the present invention. Gas generator 10 includes an initiator holder 12 for receiving and securing an initiator 48 therein. Holder 12 includes a body 14 and an annular wall 16 extending from body 14 to define a cylindrical cavity 18. An annular shoulder 20 is formed in the interior of cavity 18. A plurality of first crimp tabs 22 are formed along an edge 24 of wall 16. A plurality of second crimp tabs 26 extend along an outer edge 28 of body 14. An annular groove 30 is formed in body 14 along a base of wall 16, between wall 16 and second crimp tabs 26. Holder 12 also has a pair of axially extending holes 32, 34 through which initiator electrodes extend. A rear portion of holder 12 is configured to provide an interface mateable with a complementary connector of a wiring harness or other suitable initiator activation signal transmission medium. Holder 12 is formed from a metal or metal alloy using a suitable manufacturing process, such as die casting or machining.

Referring again to FIGS. 1-3, the gas generator of the present invention incorporates a fluid-impermeable blast director 42 for channeling the blast produced by activation of an initiator. Blast director 42 has a tubular body 44 and a flared end portion 46 extending outwardly at an angle from the body. The interior of blast director body 44 is dimensioned to provide a clearance fit therein to accommodate a charge cup portion 50 of an initiator, as described below. In one embodiment, flared end portion 46 is configured to abut initiator 48 in a manner described in detail below. Thus, the angle at which flared end portion 46 extends outward from body 44 may conform to an angled surface formed on initiator 48. Blast director 42 is formed from a metal or metal alloy using a suitable manufacturing process, such as roll forming or extrusion.

Referring to FIG. 2, a conventional initiator 48 including an initiator charge is secured in holder 12 for igniting a gas generant composition contained in the gas generator. One exemplary igniter construction is described in U.S. Pat. No. 6,009,809, incorporated herein by reference. Initiator 48 is positioned inside holder cavity 18 and secured to holder 12. Specifically, initiator 48 is inserted axially into cavity 18 wherein a portion of the initiator abuts cavity shoulder 20, thereby seating the initiator within the cavity. Blast director 42 is then positioned over initiator 48, with flared end portion 46 of blast director 42 abutting a complementarily angled portion of initiator 48. As shown, a portion of an initiator charge cup 50 may project into the interior of blast director body 44. First crimp tabs 22 are then deformed radially inwardly to fold over portions of blast director flared end portion 46, thereby securing blast director 42 to initiator holder 12.

Referring to FIG. 3, gas generator 10 is also provided with a gas-generating propellant in the form of a cylindrical insert 52 dimensioned so as to be spaced apart from initiator 48. Gas generant insert 52 may be produced from any gas generant composition capable of being formed into the desired cylindrical shape, while satisfying the combustion requirements of a desired application. Insert 52 is also dimensioned to provide a radial clearance with blast director body 44.

Generally, the gas generant composition is a fast burning, relatively easily ignitable composition. In one embodiment, the gas generant comprises silicone as a fuel at about 10-25% by weight; a perchlorate oxidizer such as ammonium, lithium, or potassium perchlorate; and a strontium salt such as strontium nitrate or strontium carbonate as a coolant. The oxidizer and coolant typically comprise about 75-90% by weight of the gas generant. The silicone may be purchased, for example, from General Electric or other well-known suppliers. Silicone provides the additional benefit of acting as a binder, facilitating the formation of the cylindrical shape described herein. The other gas generant constituents may be provided by suppliers or by manufacturing methods well known in the art. Exemplary suitable compositions are disclosed in U.S. Pat. No. 6,805,377, incorporated by reference herein.

Referring again to FIG. 3, a casing 54 is provided for holding gas generant insert 52 and for confining therein ignition products generated by activation of initiator 48. Casing 54 has a body portion including an annular wall 56 and a circumferential, outwardly extending lip 58 formed along the edge of the wall. Casing 54 is formed from a metal or metal alloy using a suitable manufacturing process, such as drawing. Gas generant insert 52 is positioned abutting an inside surface of casing 54, as shown in FIG. 3. After blast director 42 has been crimped to holder 12, casing 54 and gas generant insert 52 contained therein are positioned over blast director 42. Second crimp tabs 26 on holder 12 are then deformed radially inwardly to fold over casing lip 58, thereby securing the casing to holder 12. Alternative means of securing the blast director to holder 12 and/or for securing casing 54 to the holder (for example, adhesive application, fasteners, etc.) may also be used.

Operation of the gas generator will now be discussed. Upon a crash event, a signal from a crash sensor (not shown) is conveyed to initiator 48, thereby activating the initiator and generating flame and ignition products. The flame and ignition products propagate outwardly from initiator 48 to impinge upon gas generant composition 52, igniting gas generant 52 which combusts to produce gases for actuating the pretensioner. Gas pressure resulting from ignition of gas generant composition 52 causes casing 54 to rupture, thereby releasing the gases which are then channeled into the pretensioner mechanism.

In conventional operation (without blast director 42 installed), flame and ignition products from initiator 48 expand outward both axially along axis L, and radially. Radial propagation of the flame and ignition products may cause gas generant insert 52 to break into pieces. The gas generant pieces have a greater aggregate surface area than the intact gas generant insert. In addition, the sizes of the resulting gas generant pieces are unpredictable. These factors contribute to ballistic variability, making it difficult to control and predict the inflation characteristics of the gas generator. Blast director 42 is interposed between initiator 48 and gas generant composition 52 to provide a barrier between the gas generant composition and the blast resulting from ignition of the initiator charge. This aids in preventing the initiator blast and the resulting radially-propagating flame and ignition products from fracturing gas generant insert 52, by channeling the flame in an axial direction, generally along axis L. This increases the likelihood that gas generant insert 52 will remain intact during the ignition and burn processes.

The length of blast director 42 can be varied to control the amount of gas generant insert 52 exposed to flame and ignition products emanating radially from blast director 42. For example, with the relatively shorter blast director shown in FIG. 3, an end portion of blast director 42 is longitudinally spaced apart from an end portion of gas generant composition 52 such that an end portion of gas generant insert 52 will be directly exposed to radially outwardly expanding ignition products emanating from the end of blast director 42.

FIG. 4 shows an alternative embodiment incorporating a relatively longer blast director. In this embodiment, an end portion of blast director 42 is longitudinally spaced apart from an end portion of gas generant composition 52 such that ignition products emanating from blast director 42 deflect off of casing 54 prior to impinging on gas generant insert 52, thereby slightly delaying the onset of gas generant combustion and helping further to ensure that gas generant insert 52 is not fractured by direct exposure to the flame and ignition products initially generated by initiator 48. The length of blast director 42 may also be varied to correspond with any length of gas generant insert 52 required for a particular application, for purposes of achieving any of the effects described above.

Referring to FIGS. 5-9, in a particular application, a micro gas generator 10 as described herein is incorporated into a seatbelt pretensioner 110 for a vehicle occupant protection system. Gas generator 10 is adapted to pretension a seat belt 112 of a conventional seat belt retractor 114. Exemplary seat belt retractors wherein the pretensioner of the present invention has potential application are described in U.S. Pat. Nos. 4,558,832 and 4,597,546, herein incorporated by reference. In general, a pretensioner 110 in accordance with the present invention may if desired replace many pretensioners now employed in the art.

A housing 118 contains the gas generator 10. Upon pretensioner activation, the gas generator 10 fluidly communicates with a piston 120. The piston 120 is made from steel, brass, aluminum, plastic, or other sufficiently rigid material. Electrical contacts on initiator 48 communicate with any known crash event sensor (not shown) that signals actuation of the pretensioner 10. Once the initiator 48 receives a signal, from an accelerometer for example, the initiator 48 ignites the pyrotechnic gas generant 52 (not shown in FIGS. 5-9).

Gas produced from combustion of the gas generant then propels the piston 120 into a flat portion 130 of a strap 134. A plurality of apertures or perforations 136 (FIG. 8) are evenly or otherwise spaced along the length of the strap 134. The strap 134 is loosely arranged around a portion of the circumference of a hub 138. Hub 138 is press-fitted or otherwise fixed to a retractor axle 140 and therefore rotatably communicates with the retractor axle 140. As shown in FIG. 5, hub 138 freely rotates with the retractor axle 140 prior to pretensioner activation. Hub 138 contains a plurality of knobs or protrusions 142 (FIG. 7) evenly or otherwise spaced about the circumference of hub 138 wherein each knob in the plurality 142 preferably corresponds to at least one aperture in the plurality 136. The distance from one respective perforation to another respective perforation in the strap 134 is roughly equivalent to the arcuate distance from one corresponding protrusion to another about the hub 138. As shown in FIG. 8, the diameter of the perforations 136 is sized to be at least slightly larger than the diameter of the protrusions 142. Alternatively, the perforations 36 may be elliptically shaped or otherwise shaped to accommodate the smaller sized protrusions 142. In essence, the perforations 136 are sized to facilitate rapid engagement and meshing with the protrusions 142 once the pretensioner 110 is activated.

A first cylindrical channel 144 contains the hub 118. A second rectangular channel 146 has a first end 148 and a second end 150, and is formed in perpendicular orientation and in volumetric intersection with the first channel 144. The actuator 120 is housed in the first end 148, prior to ignition of the gas generant and activation of the pretensioner 110. A spring 152 may be used to bias the actuator 120 against the flat portion 130 of the strap 134 that crosses the channel 146. Noise due to vibration is thereby inhibited. Strap 134 has a free first end 156 that extends from a second flat portion 158 of the strap 134 that is oriented about the circumference of the hub 138. A second end 154 of the strap 134 is secured to the housing 118 at a point adjacent to the piston 120. When arranged in this manner, the strap 134 provides a multiplier effect similar to that afforded by the use of gearing style motion multipliers.

Upon activation of the pretensioner 110 and combustion of the gas generant 52, the piston 120 is propelled into the strap 134 wherein the strap 134 then grips and tightens around the hub 138. Or, upon combustion of the gas generant and upon rotation of the hub 138, the plurality of knobs 142 are forcibly seated into respective apertures within the plurality of apertures 136. The forward linear motion of the piston 120 thus results in a rotary movement of the hub 138 and the retractor axle 140, thereby tightening the belt 112.

To illustrate a retractor response based on-pretensioner operation, see U.S. Pat. No. 5,899,399 to Brown et al., herein incorporated by reference. "Pretensioning" is generally defined to mean to take up slack in the seat belt. In accordance with the present invention, the gas produced by the gas generant propels the piston 120 into the strap 134 and thus affects rotary advancement of the hub 138 thereby tightening the slack in the seat belt 112.

Figure 10:
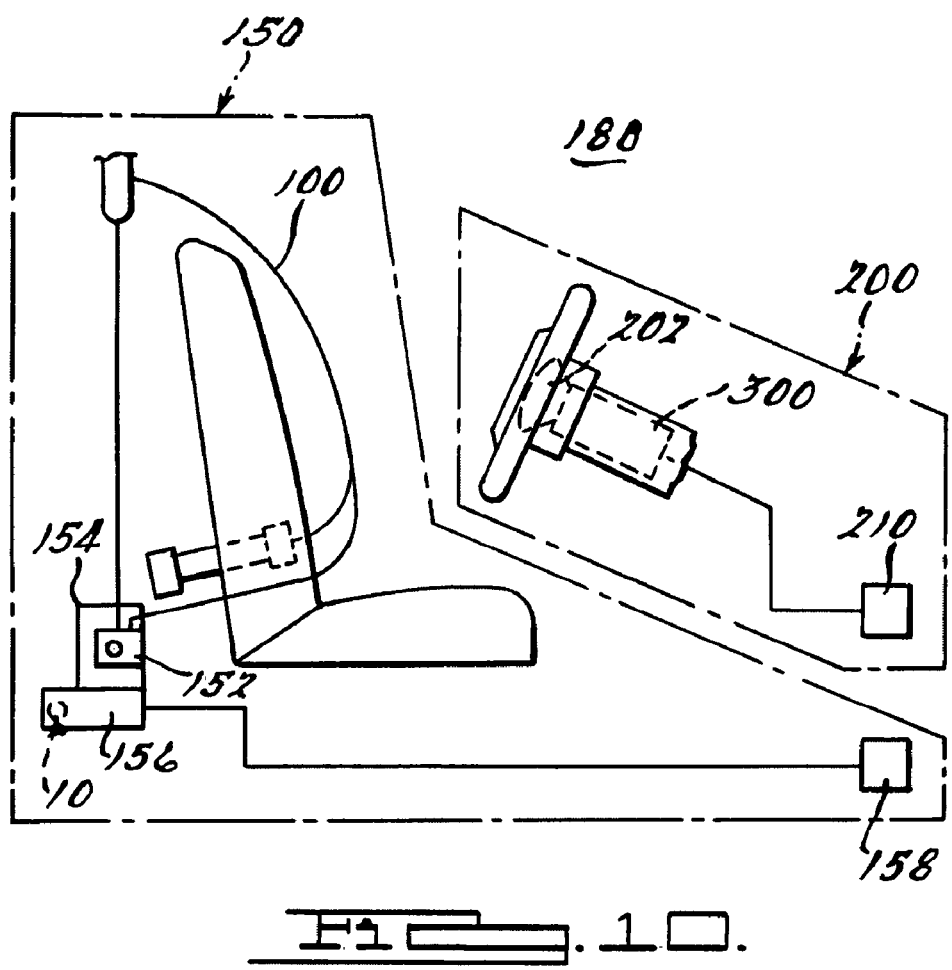
FIG. 10 is a schematic representation of an exemplary vehicle occupant restraint system including a micro gas generator incorporating a blast director in accordance with the present invention.

Referring to FIG. 10, in a particular application, a micro gas generator 10 as described herein is incorporated into a safety belt pretensioner 156 employed in a safety belt assembly 150 used in a vehicle occupant protection system 180. Safety belt assembly 150 includes a safety belt housing 152 and a safety belt 100 extending from housing 152. A safety belt retractor mechanism 154 (for example, a spring-loaded mechanism) may be coupled to an end portion of the belt. Safety belt pretensioner 156 may be coupled to belt retractor mechanism 154 to actuate the retractor mechanism in the event of a collision. Micro gas generator 10 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of initiator 48 (not shown in FIG. 10) in micro gas generator 10. U.S. Pat. Nos. 6,505,790 and 6,419,177 provide illustrative examples of pretensioners actuated in such a manner.

Referring again to FIG. 10, vehicle occupant restraint system 180 may also include additional elements such as an airbag system 200. Airbag system 200 includes at least one airbag 202 and an inflator 300 coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 300 in the event of a collision.

It should be appreciated that safety belt assembly 150, airbag system 200, and more broadly, vehicle occupant protection system 180 exemplify but do not limit gas generating systems contemplated in accordance with the present invention.

Embodiments of the micro gas generator described herein may also have application in other elements typically employed in vehicle occupant protection systems. A vehicle occupant protection system may be defined to include at least one of the following a device such as an airbelt, a buckle pretensioner, and/or a pyrotechnic actuator. Specifically, embodiments of the micro gas generator described herein may also be used with an airbelt (as exemplified in U.S. Pat. No. 6,685,220, incorporated herein by reference), with a buckle pretensioner (as exemplified in published U.S. Pat. No. 6,460,935, incorporated herein by reference), with a piston-based pyrotechnic actuators (as exemplified in U.S. Pat. No. 6,568,184, incorporated herein by reference), or with any other device incorporating a micro gas generator of the present invention within a vehicle occupant protection system. Additionally, the vehicle occupant protection system may also include, in addition to the device(s) containing the micro gas generator, other device(s) typically employed in vehicle occupant protection systems, such as an airbag inflation system 200 as described above.

Referring again to FIGS. 2-4, an additional benefit of the blast director of the present invention is the restriction of expansion of sections, or "petals", formed from initiator charge cup 50 upon ignition of the initiator charge. In some conventional micro gas generator designs, a surface of charge cup 50 residing along axis L is scored into petal-shaped sections which separate and expand radially outwardly upon ignition of the initiator charge (for example, see U.S. Pat. No. 6,168,202, incorporated herein by reference.) Upon expanding, the petals may impact a radially-positioned gas generant (as shown in FIGS. 2-4), possibly fracturing the gas generant or otherwise undesirably modifying its geometry. Uncontrolled modification of the gas generant geometry may induce undesirable ballistic variability into the gas generator system upon system activation. The blast director of the present invention helps prevent this, by restricting or preventing radial expansion of the petals past the sidewalls of the charge cup.

Radial overexpansion of the petals can also damage the crimps securing initiator 48 within holder 14, thereby loosening initiator 48 within holder 14 and possibly providing a leakage path for generated gases through the holder. Blast director 42 aids in preventing this effect, by restricting radial movement of the petals.

Unless otherwise noted, elements of the pretensioner may be fabricated using methods known in the art. In addition, a gas generator as described herein may be incorporated into any of a wide variety of alternative pretensioner designs.

It will be understood that the embodiments of the gas generator and blast director described herein are not limited to use in seatbelt pretensioners, but may also be used in other applications in which it is important to maintain the structural integrity of a gas generant insert or other object exposed to blast effects. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. A gas generator comprising:
   an initiator including an initiator charge;
   a gas generant composition spaced apart from the initiator; and
   a fluid-impermeable blast director interposed between the initiator and the gas generant composition to provide a barrier between the gas generant composition and a blast resulting from ignition of the initiator charge when the initiator charge is ignited,
   the blast director opening in a first direction, and wherein there is no gas generant composition positioned in a path of a blast emanating from the blast director in the first direction.

2. The gas generator of claim 1 wherein the gas generant composition is formed into a single-piece insert.

3. The gas generator of claim 1 wherein the gas generant composition is in fluid communication with the initiator prior to ignition of the initiator charge.

4. The gas generator of claim 1 wherein the initiator has a longitudinal axis, the gas generant composition is spaced apart from the initiator laterally of the longitudinal axis, and the blast director directs the blast from ignition of the initiator charge longitudinally when the initiator charge is ignited.

5. The gas generator of claim 4 wherein an end portion of the blast director is longitudinally spaced apart from an end portion of the gas generant composition such that a portion of the gas generant composition is directly exposed to laterally propagating initiator combustion products emanating from the end of the portion of the blast director when the initiator charge is ignited.

6. The gas generator of claim 4 further comprising a casing enclosing the gas generant composition and the initiator, and wherein an end portion of the blast director is longitudinally spaced apart from an end portion of the gas generant composition such that combustion products emanating from the end of the portion of the blast director impinge upon the casing and are redirected into contact with the gas generant composition when the initiator charge is ignited, thereby delaying an onset of combustion of the gas generant composition.

7. A seatbelt device comprising:
   a seatbelt retractor comprising a spool;
   a seatbelt wound about said spool; and
   a seatbelt pretensioner including a gas generator, the gas generator including an initiator including an initiator charge, a gas generant composition spaced apart from the initiator, and a fluid-impermeable blast director interposed between the initiator and the gas generant composition to provide a barrier between the gas generant composition and a blast resulting from ignition of the initiator charge when the initiator charge is ignited,
   the blast director opening in a first direction, and wherein there is no gas generant composition positioned in a path of a blast emanating from the blast director in the first direction.

8. A vehicle occupant restraint system comprising a gas generator including an initiator having an initiator charge, a gas generant composition spaced apart from the initiator, and a fluid-impermeable blast director interposed between the initiator and the gas generant composition to provide a barrier between the gas generant composition and a blast resulting from ignition of the initiator charge when the initiator charge is ignited, the blast director opening in a first direction, and wherein there is no gas generant composition positioned in a path of a blast emanating from the blast director in the first direction.

* * * * *